(No Model.) 4 Sheets—Sheet 2.
W. D. SLAUSON.
COTTON AND HAY PRESS.
No. 287,734. Patented Oct. 30, 1883.
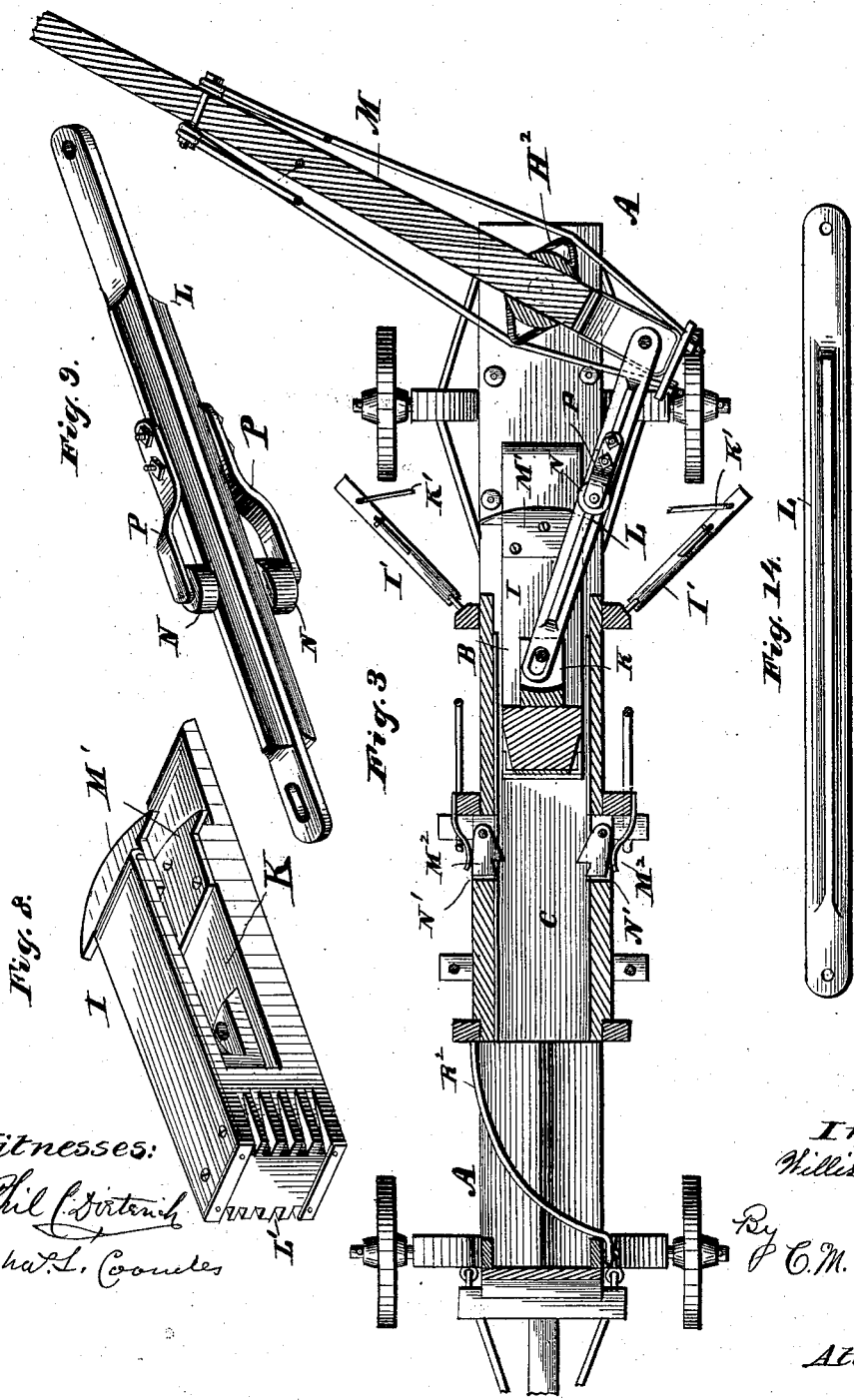
Witnesses:
Phil C. Dietrich
Chas. L. Coombs
Inventor:
Willis D. Slauson
By C. M. Alexander,
Attorney.

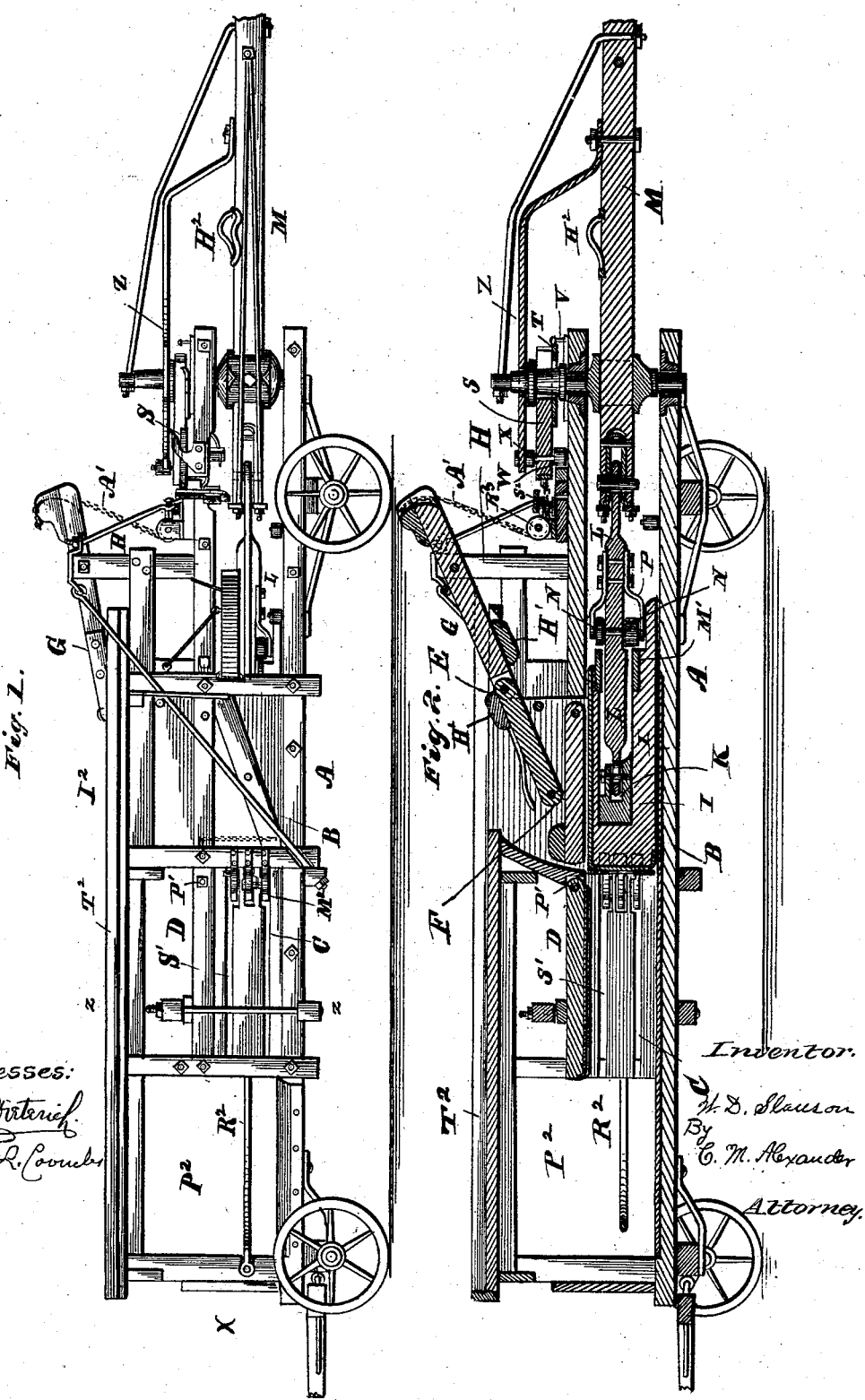

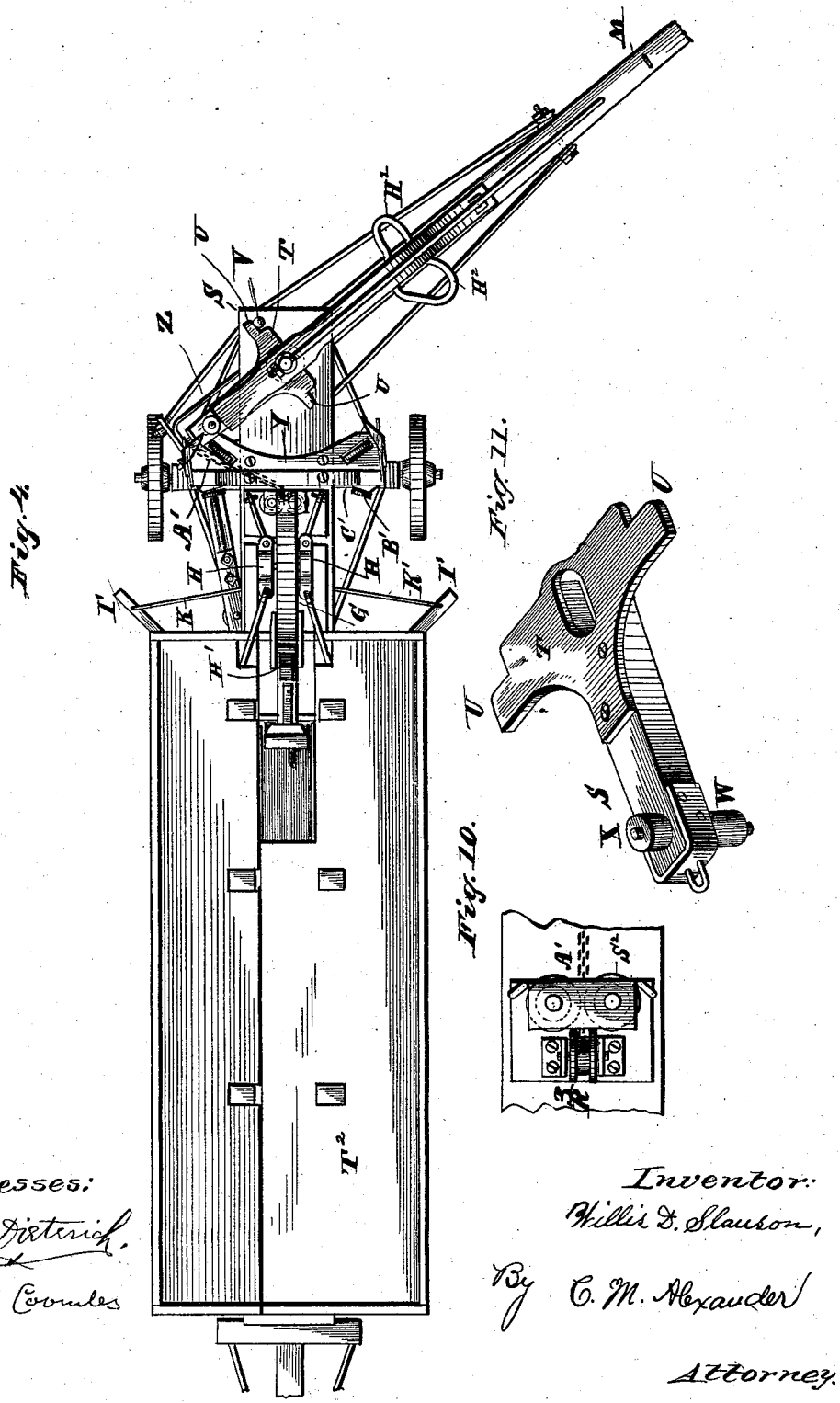

(No Model.)  
4 Sheets—Sheet 4.
W. D. SLAUSON.
COTTON AND HAY PRESS.
No. 287,734. Patented Oct. 30, 1883.
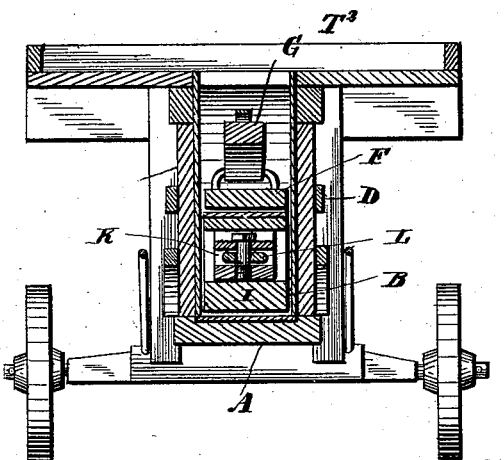
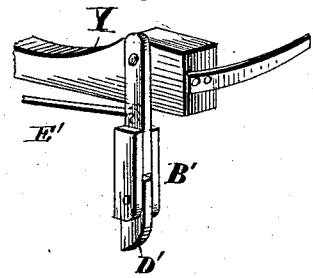
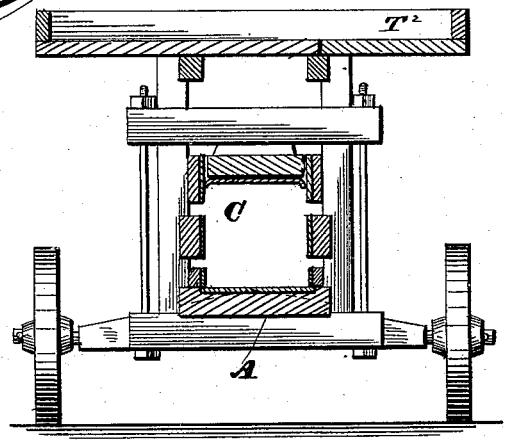
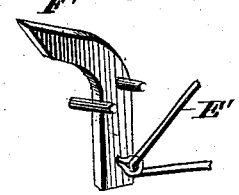
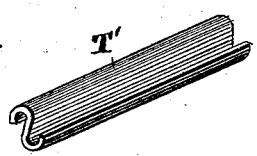
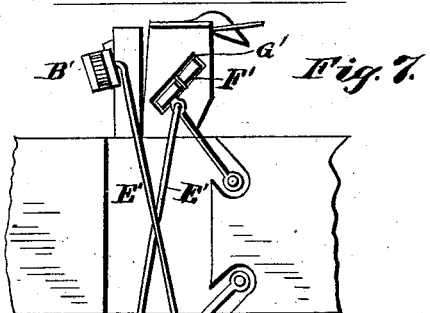
Witnesses:
Phil C. Dieterich
Chas L. Coombs
Inventor:
Willis D. Slauson
By C. M. Alexander,
Attorney.
N. PETERS, Photo-Lithographer, Washington, D. C.

UNITED STATES PATENT OFFICE.

WILLIS D. SLAUSON, OF RACINE, WISCONSIN.

COTTON AND HAY PRESS.

SPECIFICATION forming part of Letters Patent No. 287,734, dated October 30, 1883.

Application filed July 18, 1883. (No model.)

*To all whom it may concern:*

Be it known that I, WILLIS D. SLAUSON, a citizen of the United States, residing at Racine, in the county of Racine and State of Wisconsin, have invented certain new and useful Improvements in Cotton and Hay Presses, of which the following is a specification, reference being had therein to the accompanying drawings.

This invention relates to certain improvements in presses for pressing hay, cotton, and other like material; and it has for its objects to provide for automatically packing the material in the packing-chamber, and then compressing it into a bale, and finally discharging the bales at either side of the press at one end, as more fully hereinafter specified. These objects I attain by the means illustrated in the accompanying drawings, in which—

Figure 1 represents a side elevation of my improved press; Fig. 2, a longitudinal vertical section thereof; Fig. 3, a horizontal section on the line $x\ x$ of Fig. 1; Fig. 4, a plan view of the press; Fig. 5, a transverse vertical section on the line $y\ y$ of Fig. 1; Fig. 6, a vertical section on the line $z\ z$ of Fig. 1; Fig. 7, a detached detail view of a portion of the operating mechanism of the press; Fig. 8, a detached perspective view of the follower; Fig. 9, a detached perspective view of the pitman which moves the follower; Fig. 10, a detached top view, showing the pulleys around which the chain of the packing device passes; Fig. 11, a detached perspective view of the lever which operates the chain; Fig. 12, a detached perspective view of one of the trips, by means of which the mechanism is dropped to operate the packing device; Fig. 13, a detached view of one of the pawls operating in conjunction with the trips to drop the packing device; Fig. 14, a modification of the pitman, and Fig. 15 a perspective view of a guide employed for inserting the binding-wires.

The letter A indicates the base of the press, which is mounted upon wheels, so that it may be readily transported from place to place.

B indicates the packing-chamber, which is located about midway between the ends of the press, and C the press-box, which is located at the rear of the packing-chamber, forming a continuation of the same.

The letter D indicates a platform, located above and parallel with the base of the press, on a level with the top of the press-box. The packing-chamber extends to the top of the press, and within it is hinged, at E, a packer, F, to the upper side of which is pivoted one end of a toggle-joint lever, G, which is fulcrumed between two standards, H, secured to the platform above mentioned. The packer, as well as the toggle-lever, is weighted, as indicated by the letter H', for the purpose hereinafter specified.

The letter I indicates the follower, which has a horizontal slot, K, at its rear, in which is pivoted one end of a pitman, L, the other end of which is pivoted in the slotted end of the actuating-lever M, which is fulcrumed in bearings in the base and platform at one end of the press.

In order to relieve the connection of the pitman with the follower of undue strain, the follower, at its end, is provided with cam-plates M', against which are adapted to work the rollers N, journaled between the pitman and brackets P secured thereto. The long arm of the lever has swiveled to its end a singletree, to which draft-animals may be hitched to operate the lever. The upper journal or fulcrum-pin of the lever extends up above its bearing, and to it is loosely secured the slotted end of a lever, S, which has secured to it a slotted plate, T, which is provided with lateral arms U on opposite sides, which come alternately into contact with the stops V, for the purpose more fully hereinafter specified. The lever S, at its ends, is provided with antifriction rollers W X, the lower one of which bears against a curved guideway, Y, attached to the platform, the upper one being so arranged as to be engaged by the end of a flat metallic bar, Z, secured to the actuating-lever during a portion of its travel, in order to operate the toggle-lever, by means of the connecting-chain A', to elevate the packer and permit the packing-chamber to be filled.

The letter B' indicates two trips pivoted to the opposite ends of a transverse beam, C', and provided with loosely-connected pawls D' at their free ends. The said trips are connected by means of wires E', or otherwise, with the pawls F', which are secured in slots G' in the beam, forming the curved guideway before mentioned, for the purpose more fully hereinafter set forth.

The letter H² indicates two brackets—one secured to each side of the actuating-lever—their object being to engage and actuate the trips, as will more fully presently appear.

The letter I' indicates two beams, one secured at each side of the press at a suitable angle, and braced by means of stays K', the said beams serving as stops for the actuating-lever.

The forward end of the plunger or follower is provided with lateral grooves L', beveled from the front rearwardly, which work in line with a series of spring-actuated pawls, M², pivoted in slots N' in the sides of the press, the said pawls serving to hold the bale when the plunger recedes, as will be more fully hereinafter explained. The top of the press-box is hinged at P', so that it may be inclined, to compress the bale at the rear as it is pressed into the bale-box. At the rear of the press is located a chamber, P², the floor of which inclines toward opposite sides from the center, the sides being open, as shown. The said chamber is provided with a movable guide, R², which may be affixed at either side in such manner as to discharge the pressed and bound bale at either side, as may be desired. The press-box is formed with longitudinal slots S' at each side, through which may be passed the metallic guides T' for the band-wires, the guides being so constructed that the wires may be passed through them and bound around the bale, and carried with the bale until it is discharged, when they may be removed. Upon the top of the frame is a platform, T², having an opening at the front over the packing-chamber, through which toggle-lever is adapted to work, and through which the material may be fed to the packing-chamber.

The operation of my invention will be understood in connection with the above description, and is as follows: The material is fed into the packing-chamber, while the packer is up, by an attendant stationed on the upper platform, the actuating-lever being shifted fully to one side. When the said chamber is properly charged, the lever is moved by the draft-animals in the arc of a circle, causing the brackets to move the trips, so as to release the toggle-lever and permit the packer to drop on the material. This it does by reason of the weights, and, as the toggle-lever straightens out, prevents the packer from being moved upward from pressure within the packing-chamber. As the actuating-lever is carried forward the pitman forces the follower or plunger toward the press-box, forcing the material in the press-box, and during its movement the metallic strip attached to the actuating-lever engages the upper roller of the lever, so as to operate the toggle-lever to raise the packer. The beveled grooves at the forward end of the follower or plunger press outward the pawls secured at the forward end of the press-box, so as to permit the material to be forced into the same; but upon receding the pawls fall back into normal position, and prevent the pressed material from springing back by its elasticity into the packing-chamber. During the pressing the guides are inserted transversely through the press-box, and the binding-wires are passed through the same and tied, and the guides are carried with the banded bale to the rear of the press, when they may be removed and held ready for further use.

A most important feature of my invention lies in the relative arrangement of the actuating-lever, the pitman, and the follower, and the mechanism for operating the toggle-lever, by means of which all tendency of the actuating-lever to be moved by the back-pressure of the compressed bale is obviated, as at the time when such pressure would occur the actuating-lever is just beginning to act, to operate the toggle-lever, which gives it sufficient work to overcome the pressure of any back action of the follower.

In some instances the cam-plates on the follower may be omitted, as well as the rollers on the pitman, and a plain pitman may be employed, as indicated in Fig. 14 of the drawings. The chain A' travels around the horizontal pulley R³ and the pulleys S², as indicated in detail in Fig. 10 of the drawings.

Having thus described my invention, what I claim, and desire to secure by Letters Patent, is—

1. The combination, with the packing-chamber, of the follower and the slotted lever, and connecting-bar, by which it is actuated, the friction-rollers secured to the said bar, and the curved plate secured to the follower, against which said rollers bear, the whole arranged to operate substantially as specified.

2. The combination, with the packer and toggle-lever, weighted as described, of the connecting-chain, the slotted lever having anti-friction-rollers, and a slotted plate having arms adapted to work against stops on each side, and the flat bar secured to the actuating-lever, the whole arranged to operate substantially as specified.

3. The combination, with the toggle-lever and the slotted lever, and plate having arms adapted to work against stops, as described, of the trips and pawls suitably connected, and the brackets on the actuating-lever adapted to operate the trips, so as to permit the packer to drop at the proper time, substantially as and for the purpose set forth.

4. The combination of the follower provided at its rear with cam-plates, and the pitman provided with friction-rollers, adapted to work against said cam-plates, substantially as specified.

5. The combination, with the press-box, of the chamber at the rear having a bottom inclining to each side, and a movable guide, whereby the bales may be discharged at either side, substantially as specified.

6. The combination of the actuating-lever, pitman, and follower, of the slotted lever and plate, the stops against which the plate works, the plate secured to the alternating lever, and the chain and toggle-lever, the whole so arranged that the slotted lever will begin to operate as the actuating-lever and pitman are about to come in line, whereby the back-pressure of the hay is prevented from moving the actuating-lever to either side, substantially as and for the purpose specified.

In testimony whereof I affix my signature in presence of two witnesses.

WILLIS D. SLAUSON.

Witnesses:
CHAS. D. DAVIS,
H. J. ENNIS.